(12) United States Patent
Blokland et al.

(10) Patent No.: US 12,317,774 B2
(45) Date of Patent: Jun. 3, 2025

(54) SYSTEM FOR MOWING PLANTS, IN PARTICULAR GRASS, AND METHOD OF FEEDING ANIMALS BY MEANS OF SUCH A SYSTEM

(71) Applicant: LELY PATENT N.V., Maassluis (NL)

(72) Inventors: Korstiaan Cornelis Blokland, Maassluis (NL); Karel Van Den Berg, Maassluis (NL); Dik-Jan Wisse, Maassluis (NL); Samuel Van Dijk, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 816 days.

(21) Appl. No.: 17/617,391

(22) PCT Filed: Jun. 23, 2020

(86) PCT No.: PCT/NL2020/050409
§ 371 (c)(1),
(2) Date: Dec. 8, 2021

(87) PCT Pub. No.: WO2020/263084
PCT Pub. Date: Dec. 30, 2020

(65) Prior Publication Data
US 2022/0232764 A1    Jul. 28, 2022

(30) Foreign Application Priority Data
Jun. 26, 2019   (NL) .................................... 2023387

(51) Int. Cl.
*A01D 34/00*       (2006.01)
*A01D 90/10*       (2006.01)
(Continued)

(52) U.S. Cl.
CPC ........... *A01D 34/008* (2013.01); *A01D 90/10* (2013.01); *A01K 5/0275* (2013.01); *A01D 2101/00* (2013.01)

(58) Field of Classification Search
CPC .. A01D 34/008; A01D 90/10; A01D 2101/00; A01K 5/0275
(Continued)

(56) References Cited

U.S. PATENT DOCUMENTS

| 5,424,957 A | * | 6/1995 | Kerkhoff | ................. A01K 5/02 |
| | | | | 119/51.02 |
| 2017/0202177 A1 | | 7/2017 | Loosveld | |

(Continued)

FOREIGN PATENT DOCUMENTS

| CN | 205284168 U | 6/2016 |
| EP | 0 628 239 A1 | 12/1994 |

(Continued)

OTHER PUBLICATIONS

International Search Report, issued in PCT/NL2020/050409, dated Sep. 18, 2020.

(Continued)

*Primary Examiner* — Mahmoud Gimie
(74) *Attorney, Agent, or Firm* — Birch, Stewart, Kolasch & Birch, LLP (57) ABSTRACT

A system for mowing plants includes a piece of land on which the plants grow, and an autonomous, self-propelled mowing vehicle. The system includes a dwelling space for keeping animals including a feeding area for feeding mowed plants to the animals. A control system for controlling the mowing device is configured to (i) mow plants on the piece of land by means of the mowing device while the mowing vehicle drives across the piece of land, (ii) displace the mowing vehicle with mowed plants accommodated in the holder from the piece of land to the feeding area in the dwelling space, and (iii) dispense mowed plants to said feeding area by means of the dispensing device to feed the mowed plants to the animals.

20 Claims, 2 Drawing Sheets

(51) Int. Cl.
   *A01D 101/00*   (2006.01)
   *A01K 5/02*   (2006.01)

(58) Field of Classification Search
   USPC .......................................... 701/50
   See application file for complete search history.

(56) References Cited

U.S. PATENT DOCUMENTS

| | | | | |
|---|---|---|---|---|
| 2018/0213722 A1* | 8/2018 | Pratt | ............... | A01D 43/063 |
| 2023/0232741 A1* | 7/2023 | Van Den Berg | ..... | A01D 41/133 |
| | | | | 701/50 |
| 2024/0016086 A1* | 1/2024 | Van Den Berg | ..... | A23N 17/008 |

FOREIGN PATENT DOCUMENTS

| | | |
|---|---|---|
| EP | 1 369 012 A1 | 12/2003 |
| GB | 905116 | 9/1962 |

OTHER PUBLICATIONS

Pöttinger Landtechnik Gmbh, "News—Pöttinger Landtechnik International", May 25, 2017, XP055668910, Retrieved from the Internet: URL:https://www.poettinger.at/de_in/Newsroom/Artikel/9691/maehladen-bringt-gute-milchleistung-bei-geringen-produktionskosten [retrieved on Dec. 1, 2021], total 2 pages.
Written Opinion of the International Searching Authority, issued in PCT/NL2020/050409, dated Sep. 18, 2020.

* cited by examiner

SYSTEM FOR MOWING PLANTS, IN PARTICULAR GRASS, AND METHOD OF FEEDING ANIMALS BY MEANS OF SUCH A SYSTEM

BACKGROUND OF THE INVENTION

Field of the Invention

The invention relates to a system for mowing plants, in particular grass.

Description of Related Art

EP 1369012 A1 discloses a system for mowing plants, such as grass. The plants grow on an agricultural plot. A harvest container is arranged on the agricultural plot which may contain a relatively large amount of harvested product. The system comprises an autonomous harvesting machine, which is provided with a mowing device and a machine container for containing harvested product. The autonomous harvesting machine comprises a route information system with a position-determining means for determining the position of the autonomous harvesting machine in the agricultural plot by means of for example a GPS system. Thus it is possible for a control unit of the autonomous harvesting machine to move the harvesting machine to the harvest container with the aid of data from the route information system. In this case, the amount of harvested product in the harvest container is taken into account, as measured, for example, by a weighing device. Thereafter, the harvested product can be transferred from the machine container to the harvest container. When the supply in the harvest container has reached a certain level, a signal may be generated in order to activate a processing device, such as a baling press or the like, by means of which the harvested plants are prepared for storage.

However, the autonomous harvesting machine is relatively slow. This is largely caused by the limited capacity of the power supply, in particular the electrical batteries of the autonomous harvesting machine. Also, the machine container of the autonomous harvesting machine only has a small storage capacity. Therefore, it takes a relatively long time before the autonomous harvesting machine has removed the plants from the agricultural plot and the harvested plants are finally actually stored. However, if the harvested plants are used as feed for animals, it is desirable to keep the time between harvesting the plants and their eventual storage as feed supply as short as possible in order to keep the quality of the feed plants optimal. Even if the autonomous harvesting machine is able to operate the entire day, so that the desired capacity can be achieved by the operating hours of the harvesting machine, in practice the relatively quick harvesting of plants using conventional machines, such as mowers, tedders, rakes, baling presses and/or loader wagons is often chosen.

BRIEF SUMMARY OF THE INVENTION

It is an object of the invention to provide an improved system for mowing plants, in particular grass.

This object is achieved according to the invention by a system for mowing plants, in particular feed plants for animals, such as grass, clover and/or alfalfa, wherein the system comprises a piece or plot of land which is situated, in particular, in the open air, with the plants growing on the piece of land, an autonomous, self-propelled mowing vehicle, which is provided with:
 a mowing device for mowing plants on the piece of land while the mowing vehicle drives across the piece of land, and
 a holder for accommodating plants mowed by the mowing device, a control system for controlling the mowing vehicle, wherein the system is provided with a dwelling space for keeping animals, such as cows, in particular an animal shed, wherein the dwelling space is provided with a feeding area for feeding mowed plants to the animals, and wherein the feeding area in the dwelling space is connected to the piece of land by means of a travelable connection, and the mowing vehicle is provided with a dispensing device for dispensing mowed plants accommodated in the holder, and the control system is configured to (i) mow plants on the piece of land by means of the mowing device while the mowing vehicle drives across the piece of land, (ii) displace, in particular drive, the mowing vehicle with mowed plants accommodated in the holder from the piece of land to the feeding area in the dwelling space, and (iii) dispense mowed plants to said feeding area by means of the dispensing device in order to feed the mowed plants to the animals.

The system according to the invention is a feeding system for preferably fully automatically, feeding mowed plants, in particular grass, to animals, for example cows, such as dairy cows and/or meat cows. The control system may be attached to the mowing vehicle, in particular as a "stand-alone" control system, or may comprise a central control system and a control unit attached to the mowing vehicle which are able to exchange data with each other.

The autonomous mowing vehicle of the system according to the invention substantially has the same limited capacity problem as described above for the prior art, i.e. the capacity of the power supply generated by electrical batteries is relatively small and the holder for accommodating the mowed plants has a small storage capacity. Compared to, for example, a conventional tractor with a front mower and pulled loader wagon which can harvest plants on a piece of land with a large surface in one go, the autonomous mowing vehicle according to the invention will have to drive considerably more often in order to harvest the same amount of plants and will in each case only be able to transport a small amount of plants. However, the system according to the invention is configured to take the freshly mowed plants directly to a feeding area in a dwelling space for the animals, in particular a feed fence in an animal shed. In other words, even if the autonomous mowing vehicle according to the invention drives slowly and the holder can only take a relatively small amount of mowed plants, the time between harvesting the plants and the actual feeding of the mowed plants to the animals is so short, that the quality of the harvested plants remains optimal. The quality of the freshly mowed plants fed to the animals is even considerably better than the quality of the plants which are stored intermediately, for example in the form of pressed or silaged plants—the animals in the dwelling space eat plants which are virtually the same as the plants which the animals themselves would eat if they were grazing outside on the piece of land.

In a preferred embodiment, the system comprises a measuring system for measuring an amount of feed for the animals which is present on the feeding area, wherein the control system is configured to receive values for said measured amount of feed and to determine, on the basis of the received values, a required amount of plants on the piece of land which are to be mowed by the mowing vehicle to feed to the animals. As a result thereof, the feeding by the mowing vehicle is based on the requirement for feed. For example, the control system may control the mowing vehicle in order in each case to harvest a batch of mowed plants on the piece of land and feed it to the animals, in such a way that there is always feed present in the feeding area, i.e. the animals are fed in each case before the feed in the feeding area is completely finished. The control system may control the mowing vehicle fully automatically.

The measuring system may be configured in different ways. For example, the mowing vehicle comprises a sensor for measuring the amount of feed which is present in the feeding area. While the mowing vehicle places a batch of freshly mowed plants in the feeding area by means of the dispensing device, the sensor of the mowing vehicle may measure how much feed is present in the feeding area. Preferably, the sensor performs the measurement immediately after the freshly mowed plants have been dosed out. The sensor comprises, for example, a height sensor, such as a laser sensor, for measuring the height of the feed which is situated in the feeding area. The measured feed height (in cm) may be converted into the amount of feed (in kg). However, the sensor for measuring the amount of feed which is present in the feeding area does not have to be attached to the mowing vehicle. This sensor may, for example, also comprise one or more weighing sensors which measure the weight of the feed in the feeding area.

According to the invention, it is preferred that the piece of land has a total surface, wherein the mowing vehicle is provided with a detection system for detecting the amount of plants which are mowed by said mowing device on the piece of land while the mowing vehicle with the mowing mowing device is driven from a first mowing position to a second mowing position across the piece of land, and wherein the control system is operatively connected to the detection system for receiving a parameter which is representative of said detected amount of mowed plants, and wherein the control system is configured to determine the distance traveled by the mowing vehicle from said first mowing position to said second mowing position, and wherein the control system is furthermore configured to determine, in particular predict and/or calculate, a total amount of plants which are mowable, in particular harvestable, on the piece of land on the basis of said received parameter, said traveled distance and the total surface of the piece of land.

In practice, all of the mowed plants are silaged, for example in a trench silo, or stored as wound bales which have been pressed by a baling press. The silaged plants, in particular grass silage, are then fed to the animals, also during the summer. The farmer can easily estimate how much grass silage the store contains, since this is visible in the trench silo or bale store. The system according to the invention feeds the mowed plants directly to the animals. In other words, the plants which grow on the piece or plot of land form part of the feed supply. However, this supply of plants to be harvested is not physically visible, while it is desirable for the farmer to have information about the amount present in the supply. In the above-described preferred embodiment according to the invention, the supply of plants which are present on the piece of land to be mowed is calculated by means of the detection system and the control system. The holder of the mowing vehicle has a storage capacity which is so small with respect to the piece of land that the holder becomes completely filled with mowed plants after only a portion of the piece of land has been mowed. After the mowing vehicle has driven across the piece of land from the first mowing position to the second mowing position, in particular across only a portion of the piece of land, for example a number of metres, the detection system measures how many plants have been harvested on the mowed portion of the piece of land. In addition, the total surface of the piece of land is given. On the basis thereof, the control system calculates the total supply of plants to be harvested on the piece of land. This calculation may be repeated continuously, such as in "real-time", or at certain points in time, for example at a fixed frequency, while the mowing vehicle drives across the piece of land and mows. The further the mowing vehicle drives and the more plants have been mowed, the more accurate the calculation. Therefore the system according to the invention provides accurate information about the supply of plants to be harvested on the piece or plot of land which the farmer can use for the feeding strategy for the animals, even if the farmer can hardly visually estimate this supply of plants to be harvested, if at all.

The calculation of the total amount of the supply of plants to be mowed may be carried out in various ways. In an embodiment according to the invention, the control system is configured to determine, in particular predict and/or calculate, the amount of mowed plants per unit area of the piece of land on the basis of said received parameter and said distance traveled, wherein the control system is configured to determine the total amount of plants which are mowable on the piece of land on the basis of the determined amount of mowed grass per unit area and the total surface of the piece of land. In order to calculate the amount of mowed plants per unit area of the piece of land, the amount of mowed plants per length unit of said traveled distance may be multiplied with a working width of the mowing device of the mowing vehicle.

In an embodiment according to the invention, the control system comprises a memory in which at least a ration for the animals is stored, wherein the ration comprises different types of feed, including at least the plants which grow on the piece of land, and wherein the control system is configured to determine if the total amount of plants which are mowable, in particular harvestable, on the piece of land meets a supply criterion. The system according to the invention makes it possible to replace grass silage in the ration completely or partly with plants which have been freshly mowed by the mowing vehicle. If the control system has determined that the total amount of plants which are mowable on the piece of land does not meet the supply criterion, the farmer can adjust the ration for the animals and/or the purchase of feed, such as concentrate.

Preferably, the control system is configured to determine a required amount of plants on the basis of the ration, wherein the total amount of plants which are mowable on the piece of land meets the supply criterion if the total amount of plants which are mowable on the piece of land is greater than said required amount of plants. The required amount of plants is, for example, the amount of plants which are used in the ration for the animals on the basis of a determined demand for feed by the animals for a future time period. In this case, the control system may generate a warning signal if the total amount of plants which are mowable on the piece of land does not meet the supply criterion. The control system warns the farmer in time, so that the farmer can anticipate a possible shortage of plants which can be harvested on the piece of land. The generated signal may also be processed automatically by the control system, for example in order to automatically determine a modified ration.

In an embodiment according to the invention, the piece of land comprises a plurality of fields, each having a total field surface and being connected to each other by a connection which is travelable by the mowing vehicle, wherein the holder of the mowing vehicle has a storage capacity which is so small compared to the fields that the holder becomes completely filled with mowed plants when only a portion of a field is mowed, and wherein the control system is configured to determine a total amount of plants which are mowable on each individual field and/or on all fields of the piece of land together on the basis of said received parameter, said distance traveled and the total field surface of each field and/or the total surface of the piece of land. According to this embodiment, when the mowing vehicle has become completely filled with mowed plants after only a portion of a field has been mowed, the control system may not only calculate the supply of plants to be mowed on that field, but also determine the supply of plants to be mowed on other fields. The farmer can make an estimate of the total amount of plants to be harvested for all fields of the piece or plot of land together, so that the farmer knows how large the total supply of plants to be harvested in the feeding system according to the invention is.

In a preferred embodiment, the control system comprises a memory, wherein the control system is configured to store a plurality of values, determined on different days, in the memory for the total amount of plants which are mowable on the piece of land and/or on each individual field and/or on all fields of the piece of land together, and wherein the control system is configured to predict a future total amount of plants which are mowable, in particular harvestable, on the piece of land, in particular on each individual field and/or on all fields of the piece of land together on the basis of said stored values. By monitoring the total amount of plants to be mowed per field and/or for the piece of land as a whole every day, it is possible to estimate the growth of the plants in the future. As a result thereof, the future total amount of plants to be harvested can be predicted for one or more days or even longer in advance. As a result thereof, it is for example possible to plan any possible purchases of feed ahead, which is particularly advantageous.

With the above-described preferred embodiment according to the invention, wherein the detection system measures the amount of plants on the piece of land which have been mowed by the mowing device while the mowing vehicle with the mowing mowing device has driven across the piece of land from a first mowing position to a second mowing position, the first mowing position of the mowing vehicle may be a mowing starting position on the piece of land, at which the mowing vehicle starts mowing with the mowing device. The mowing starting position is, for example, an earlier mowing stop position on the piece of land where the mowing vehicle has stopped mowing when collecting a previous batch of mowed plants. This mowing stop position may be stored in a memory of the control system.

The second mowing position of the mowing vehicle is, for example, a current position on the piece of land, on which the mowing vehicle is situated when mowing with the mowing device. In this case, the control system may furthermore be configured to update the determination of the total amount of plants which are mowable, in particular harvestable, on the piece of land on the basis of said received parameter, said traveled distance and the total surface of the piece of land while the mowing vehicle with the mowing mowing device drives across the piece of land. In other words, during mowing, the control system continuously performs an update, such as in "real-time", or at preprogrammed points in time or points in time determined by the control system, of the calculation of the total amount of plants which can be harvested.

Alternatively, the second mowing position of the mowing vehicle may also be a mowing stop position on the piece of land, at which the mowing vehicle stops mowing when the holder has been filled with a determined amount of mowed plants. In that case, the control system determines the total amount of plants to be mowed which are still on the piece of land as supply once during every collecting round, i.e. after the determined amount of mowed plants have been collected from the piece of land. The determined amount of mowed plants may be input into the control system by the farmer or be determined automatically by the control system on the basis of a demand for feed by the animals.

According to the invention, the detection system for detecting the amount of plants on the piece of land which have been mowed by the mowing device while the mowing vehicle with the mowing mowing device has driven across the piece of land from a first mowing position to a second mowing position, may be configured in various ways. Preferably, the detection system comprises a weighing device which is configured to measure the weight of mowed plants accommodated in the holder, wherein the parameter which is representative of said detected amount of mowed plants is formed by a weight parameter which depends on the weight measured by the weighing device. By measuring the weight of mowed plants accommodated in the holder, it is possible to accurately determine and/or follow over time the amount of mowed plants during mowing, i.e. while the mowing vehicle drives across the piece of land. This results in a particularly high accuracy of the calculated total amount of plants which are harvestable on the piece of land.

In a preferred embodiment according to the invention, the dwelling space is provided with a feed fence which defines or delimits the feeding area, wherein a feeding alley extends along said feed fence, and wherein the mowing vehicle is configured to drive on said feeding alley along said feed fence, and wherein the control system is configured to control the dispensing device for dispensing mowed plants accommodated in the holder while the mowing vehicle drives on the feeding alley along the feed fence. The dispensing device forms a dosing device for dosing out mowed plants accommodated in the holder. During the drive along the feed fence, the mowed plants are dosed out, i.e. deposited along the feed fence in a distributed manner. Then, the animals behind the feed fence can eat the deposited mowed plants. The quality of the freshly mowed plants is particularly high, as a result of which the animals eat large amounts. With dairy cows, this is advantageous with regard to the production of milk, whereas a high consumption in meat cows aids the increase in weight.

In an embodiment according to the invention, the mowing vehicle comprises a plurality of wheels or caterpillar tracks, by means of which the mowing vehicle is displaceable, in particular across the piece of land, over a connecting path between the piece of land and the dwelling space and/or over a floor along the feeding area of the dwelling space, as well as a driving and steering system for driving and steering the mowing vehicle, which is controllable by the control system in order to allow the mowing vehicle to drive autonomously. As a result thereof, the mowing vehicle is robust and reliable, which is advantageous with a view to the service life of the mowing vehicle.

In an embodiment according to the invention, the control system comprises a position-determining system for determining the position of the mowing vehicle while driving, in particular while the mowing vehicle drives across the piece of land. The position-determining system comprises, for example, a GPS receiver. Alternatively or additionally, the position of the mowing vehicle may be determined, for example, on the basis of signals of wheel sensors which are configured to detect the revolutions of the wheels of the mowing vehicle. By means of an accurate determination of the position of the mowing vehicle while it is driving across the piece of land, the control system can accurately calculate the distance traveled by the mowing vehicle during mowing, which is advantageous for predicting the total amount of supply of plants to be harvested.

The invention also relates to a method of feeding animals, in particular cows, such as dairy cows or meat cows, by means of a system as described above.

BRIEF DESCRIPTION OF THE DRAWINGS

The invention will now be explained in more detail with reference to the attached figures, in which.

DETAILED DESCRIPTION OF THE INVENTION

Figure 1:
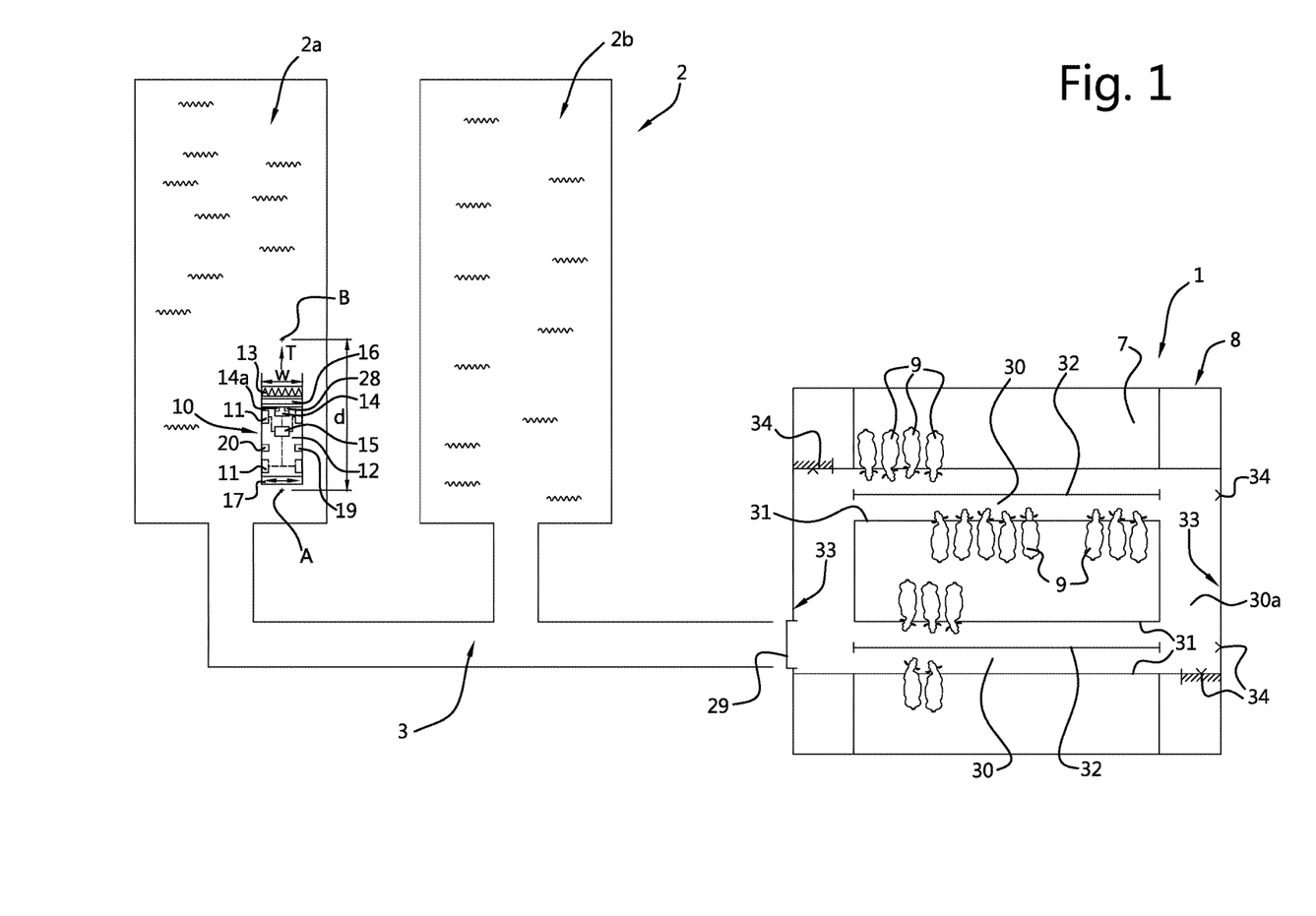
FIG. 1 shows a diagrammatic top view of a system according to the invention.

The system 1 according to the invention illustrated in FIG. 1 forms an automatic feeding system for feeding animals 9, in particular cows, such as dairy cows or meat cows. The feeding system 1 comprises a dwelling space 8 for keeping the animals 9. In this exemplary embodiment, the dwelling space 8 is formed by an animal shed. The animal shed 8 comprises a number of accommodation spaces 7 for the animals 9, in which for example cubicles for the animals 9 are arranged (not shown). Incidentally, there may also be a house, one or more further animal sheds, sheds and other buildings (not shown) in addition to the animal shed 8.

In this exemplary embodiment, the animal shed 8 has two feeding alleys 30. Obviously, more or fewer feeding alleys may be provided. In this exemplary embodiment, each feeding alley 30 is delimited on either side by a feed fence 31 which defines a feeding area for feeding the animals 9. The animals 9 are turned towards the feeding alley 30 and they can push their heads through the feed fence 31 in order to eat feed which is deposited along the feed fence 31.

The feeding system 1 comprises a piece or plot of land 2 which is situated in the open air and on which plants grow, in particular grass, clover and/or alfalfa. The plants constitute feed for the animals 9. In this exemplary embodiment, the piece of land 2 comprises a plurality of fields 2a, 2b. Although the piece of land illustrated diagrammatically in FIG. 1 comprises two fields 2a, 2b, the piece of land 2 may only comprise a single field or more than two fields. The fields 2a, 2b each have a total field surface (in $m^2$). The piece of land 2, i.e. the fields 2a, 2b together, have a total surface (in $m^2$). The fields 2a, 2b are each travelably connected to the animal shed 8 by means of a connecting path 3.

Figure 2:
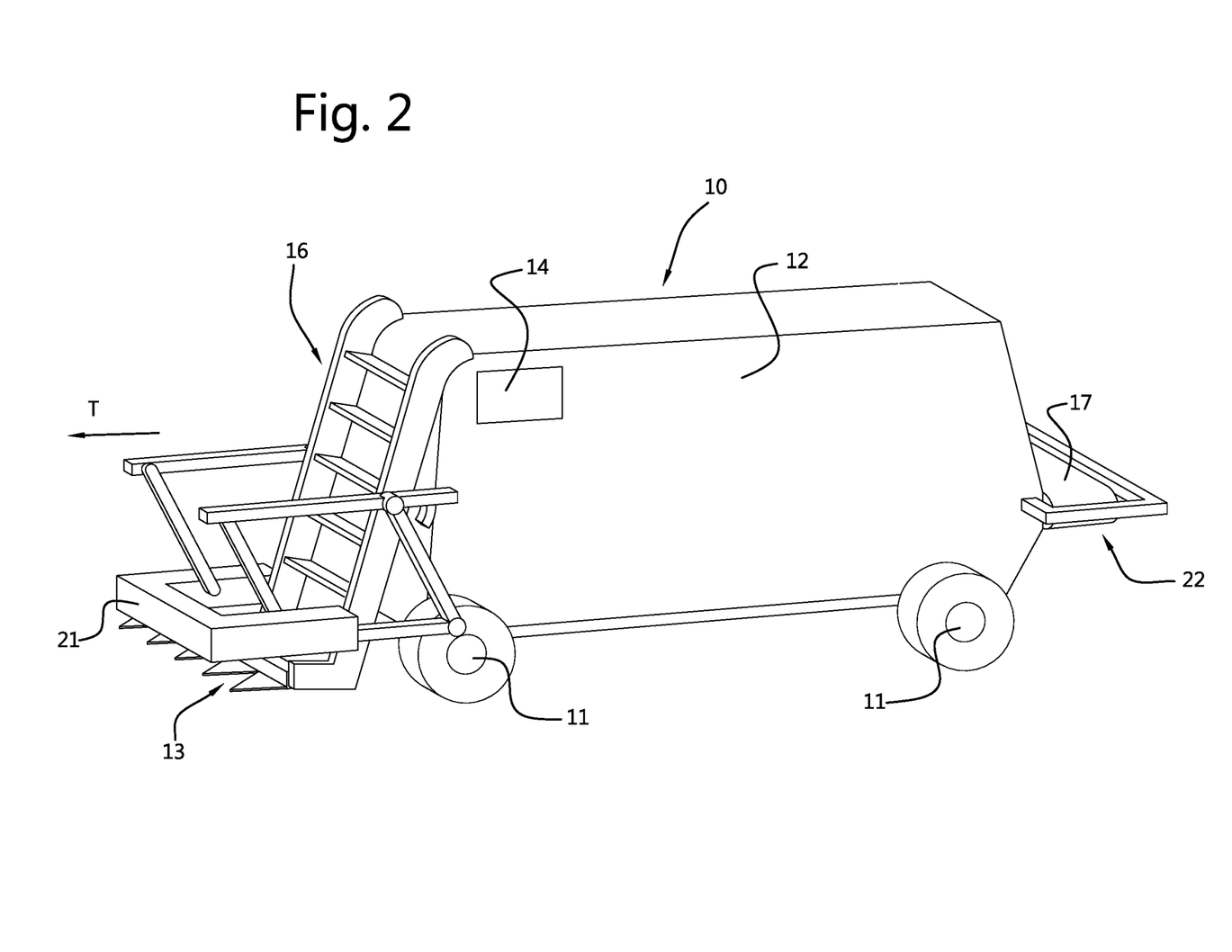
FIG. 2 shows a diagrammatic view in perspective of a mowing vehicle of the system illustrated in FIG. 1.

The feeding system 1 comprises an autonomous, self-propelled mowing vehicle 10 (see also FIG. 2). The mowing vehicle 10 is displaceable in a direction of travel T. Obviously, it is possible according to the invention for the feeding system 1 to comprise more than one autonomous, self-propelled mowing vehicle 10, in particular two autonomous, self-propelled mowing vehicles 10 (not shown). By means of wheels 11, the mowing vehicle 10 is movable across the piece of land 2, the connecting path 3, a floor in the animal shed 8, in particular on the feeding alleys 30, a farm yard and/or another surface. The animal shed 8 comprises a door opening 29 via which the mowing vehicle 10 can drive into and out of the animal shed 8. The door opening 29 is closeable by means of an animal shed door which can be opened preferably automatically.

The mowing vehicle 10 comprises a front bumper 21 and a rear bumper 22. In addition to the bumpers 21, 22, the mowing vehicle 10 may comprise further safety provisions, for example an emergency stop by means of which the mowing vehicle 10 can be stopped immediately. In this case, for example, an alarm may go off and/or a message may be sent to a user, such as an e-mail or text message.

The mowing vehicle 10 comprises a mowing device 13 for mowing plants on the piece of land while the mowing vehicle 10 drives across the latter. The mowing device 13 is diagrammatically represented in FIGS. 1 and 2. The mowing device 13 comprises, for example, a finger mowing beam. The mowing vehicle 10 comprises a picking-up and conveying device 16 for picking up plants which have been mowed by the mowing device 13 and conveying these into a holder 12, in which the mowed plants are accommodated.

The holder 12 of the mowing vehicle 10 has a storage capacity which is so small compared to the fields 2a, 2b, that the holder 12 becomes completely filled with mowed plants when mowing only a portion of a field 2a, 2b. A dispensing device 17 is provided for dispensing the mowed plants from the holder 12. In this exemplary embodiment, the dispensing device 17 comprises a conveyor belt which runs at right angles to the direction of travel T and is drivable to the left or to the right.

The feeding system 1 comprises a control system 14. In this exemplary embodiment, the control system 14 is formed by a stand-alone control system which is arranged on the mowing vehicle 10. However, the control system may also comprise a central control system which is arranged, for example, in an office in the animal shed 8, while the mowing vehicle 10 is provided with a control unit which can receive and/or send data to the central control system (not shown). In a memory 14a of the control system 14, at least one ration for the animals 9 in the animal shed 8 is stored. The ration consists, for example, of different kinds of feed, including at least the plants which grow on the piece of land 2.

The mowing vehicle 10 is autonomously displaceable by means of a driving and steering system 15 for driving and steering the mowing vehicle 10 (illustrated diagrammatically). The driving and steering system 15 of the mowing vehicle 10 is controllable by the control system 14. The control system 14 comprises a position-determining system 28 to determine the position of the mowing vehicle 10, in particular while the mowing vehicle 10 drives across the piece of land 2 and/or the connecting path 3. In this exemplary embodiment, the position-determining system comprises a GPS receiver.

In this exemplary embodiment, each wheel 11 is drivable by in each case one electrical drive motor. The electrical drive motors are connected to a battery system for storing electrical energy (not shown). In addition, the two front wheels and the two rear wheels are steerable, i.e. the wheels 11 can be turned. To this end, the driving and steering system receives control signals from the control system 14, so that the mowing vehicle 10 can drive forward, drive backwards or can take a bend on the piece of land 2 and the connecting path 3 (not shown).

Since the reception of GPS signals in the animal shed 8 is not reliable, various beacons are defined in the animal shed 8. In this exemplary embodiment, the beacons are formed by metal strips 32 which are arranged in or on a floor or other surface, walls 33 of the animal shed 8 and impact points 34. The control system 14 of the mowing vehicle 10 comprises a navigation sensor system (not shown) which is configured to cooperate with the beacons 32, 33, 34. In addition, the navigation sensor system comprises a gyroscope (not shown) in order to drive straight for a predetermined distance. Thus, the mowing vehicle 10 is capable of following different routes through the animal shed 8.

The mowing vehicle 10 according to the invention forms an automatic feed device for feeding the animals 9 in the dwelling space 7 with freshly harvested plants from the piece of land 2. While the mowing vehicle 10 drives across the field 2a in the direction of travel T (see FIG. 1), the mowing device 13 of the mowing vehicle 10 mows the plants on the field 2a. The mowed plants are transferred by the picking-up and conveying device 16 to the holder 12 of the mowing vehicle 10. After a desired batch of mowed plants has been accommodated in the holder 12, the mowing vehicle 10 navigates autonomously to one or more of the feeding alleys 30 in the animal shed 8. While the mowing vehicle 10 drives through said feeding alley 30, the control system 14 controls the dispensing device 17 in such a way that the mowed plants are dosed out along the adjacent feed fence 31 for the animals 9. In other words, the mowing vehicle 10 feeds the animals 9 freshly mowed plants of (very) high quality.

In this exemplary embodiment, the mowing vehicle 10 comprises a measuring system 19 for measuring an amount of feed for the animals 9 which is present alongside the feed fences 31. The measuring system 19 comprises one or more laser sensors for measuring the height of the feed which is situated alongside the feed fence 31 while the mowing vehicle 10 drives backwards through a feeding alley 30 along said feed fence 31 and the dispensing device 17 doses out the mowed plants from the holder 12. The measuring system 19 determines the amount of feed at the feed fence 31 directly after the freshly mowed plants have been deposited. The measured feed height (in cm) can be converted into the amount of feed (in kg).

The control system 14 is configured to receive values of said measured amount of feed at the feed fences 31 and to determine a required amount of plants to be mowed by the mowing vehicle 10 on the piece of land 2 to be fed to the animals 9 at a certain point in time on the basis of the received values. The control system 14 controls the mowing vehicle 10 in such a way that in each case a batch of mowed plants on the piece of land 2 is harvested and fed to the animals 9 before the feed at the feed fences 31 is finished completely. In other words, the mowing vehicle 10 feeds automatically in such a way that there is always feed present along the feed fences 31.

The mowing vehicle 10 comprises a detection system 20 for detecting the amount of plants which are mowed during mowing of the field 2a by the mowing device 13. In this exemplary embodiment, the detection system 20 comprises a weighing device for measuring the weight of the mowed plants accommodated in the holder 12. The measured weight (in kg) forms an indication for the amount of plants which have been harvested.

In FIG. 1, a first mowing position is denoted by A. In this case, the first position A is a mowing starting position for the mowing vehicle 10. The mowing starting position A is, for example, the position at which the mowing vehicle 10 stopped when mowing a previous batch of plants. In other words, the mowing vehicle 10 continues with mowing at the location where it had left off. While the mowing vehicle 10 drives to a second position B, the control system 14 receives a weight parameter which depends on the weight of the mowed plants in the holder 12 measured by the weighing device. In other words, the measured weight is monitored over time.

On the basis of the increase in weight of the mowed plants in the holder 12, the control system 14 determines the amount of plants which have been harvested by the mowing device while driving from A to B. In addition, the control system 14 determines the distance d traveled by the mowing vehicle 10 on the basis of GPS signals from the position-determining system. Thereafter, the control system calculates the amount of mowed plants per unit area of the field 2a (in $kg/m^2$) on the basis of said traveled distance d, in particular by multiplying the traveled distance d by a working width w of the mowing device 13. Then, the control system 14, on the basis of the total surface of the piece of land 2, i.e. of the fields 2a, 2b together, calculates a total amount of plants which are harvestable on the piece of land 2 (in kg). Furthermore, the control system 14 calculates a total amount of plants which are harvestable on each field 2a, 2b individually (in kg) on the basis of the total field surfaces of these fields 2a, 2b.

The total amount of plants which are mowable on the piece of land 2 (in kg) forms a total supply amount of feed plants which can be fed to the animals 9. It is (very) difficult for the farmer himself to estimate how many plants are present on the piece of land 2 as supply of feed. Because the control system 14 calculates this total supply of feed, it does become clear to the farmer. With the system according to the invention, the farmer is able to see, for example on a display, how large the supply of plants to be harvested on the total piece of land 2 is, i.e. on all fields 2a, 2b together.

In order to feed the animals 9 in the animal shed 8, the mowing vehicle 10 drives to the piece of land 2 one or a plurality of times a day in order to harvest a batch of grass. The control system 14 comprises a memory in which a plurality of values, determined on different days, for the total amount of plants which can be harvested on the piece of land 2 and/or on each individual field 2a, 2b, are stored. The control system 14 is configured to predict a future total amount of plants which are harvestable on the piece of land 2, in particular on each individual field 2a, 2b on the basis of said stored values. By monitoring the total amount of plants to be mowed per field 2a, 2b and for the piece of land 2 in its entirety on a daily basis, it is possible to estimate the growth of plants in the future. As a result thereof, the future total amount of plants to be harvested may be predicted one or a plurality of days or even weeks in advance.

After the control system 14 has determined the total, optionally future, supply amount of feed plants to be harvested on the piece of land 2, the control system 14 then determines if this supply amount meets a supply criterion. After the control system 14 has determined a required amount of plants on the basis of the ration, for example the amount of plants which are used in the ration for the animals 9 for a future time period on the basis of a demand for feed by the animals 9 determined by the control system 14, the control system 14 checks if the supply criterion has been met. If the total amount of plants which can be harvested on the piece of land 2 is greater than this required amount of plants, the supply criterion has been met.

If this is not the case, the control system 14 generates a warning signal for the farmer, such as an e-mail or text message. The farmer can then adjust the ration for the animals 9 and/or the purchase of feed, such as concentrate. The generated signal may also be processed automatically by the control system 14, for example in order to automatically determine an adjusted ration.

The invention is not limited to the exemplary embodiment illustrated in the figures. The person skilled in the art may implement various modifications which are within the scope of the invention.

The invention claimed is:

1. A system for mowing plants, wherein the system comprises:
    a piece of land on which the plants grow;
    an autonomous, self-propelled mowing vehicle, which is provided with:
        a mowing device for mowing the plants on the piece of land, while the mowing vehicle drives across the piece of land; and
        a holder for accommodating the plants mowed by the mowing device;
    a control system for controlling the mowing vehicle;
    a dwelling space for keeping animals,
    wherein the dwelling space is provided with a feeding area for feeding the mowed plants to the animals, and wherein the feeding area in the dwelling space is connected to the piece of land by a travelable connection,
    wherein the mowing vehicle is provided with a dispensing device for dispensing the mowed plants accommodated in the holder, and
    wherein the control system is configured to mow the plants on the piece of land by the mowing device, while the mowing vehicle drives across the piece of land, displace the mowing vehicle with the mowed plants accommodated in the holder from the piece of land to the feeding area in the dwelling space, and dispense the mowed plants to said feeding area by the dispensing device in order to feed the mowed plants to the animals.

2. The system as claimed in claim 1, wherein the system is provided with a measuring system for measuring an amount of feed for the animals which is present on the feeding area, and wherein the control system is configured to receive values for said measured amount of feed and to determine, on the basis of the received values, a required amount of plants on the piece of land which are to be mowed by the mowing vehicle to feed to the animals.

3. The system as claimed in claim 1, wherein the piece of land has a total surface, wherein the mowing vehicle is provided with a detection system for detecting the amount of plants which are mowed by said mowing device on the piece of land while the mowing vehicle with the mowing device is driven from a first mowing position to a second mowing position across the piece of land, and wherein the control system is operatively connected to the detection system for receiving a parameter which is representative of said detected amount of mowed plants, and wherein the control system is configured to determine the distance traveled by the mowing vehicle from said first mowing position to said second mowing position, and wherein the control system is furthermore configured to determine a total amount of plants which are mowable on the piece of land on the basis of said received parameter, said traveled distance and the total surface of the piece of land.

4. The feeding system as claimed in claim 3, wherein the control system is provided with a memory in which at least a ration for the animals is stored, wherein the ration comprises different types of feed, including at least the plants which grow on the piece of land, and wherein the control system is configured to determine if the total amount of plants which are mowable on the piece of land meets a supply criterion.

5. The system as claimed in claim 4, wherein the control system is configured to determine a required amount of plants to be mowed by the mowing vehicle on the basis of the ration, and wherein the total amount of plants which are mowable on the piece of land meets the supply criterion if the total amount of plants which are mowable on the piece of land is greater than said required amount of plants.

6. The system as claimed in claim 4, wherein the control system generates a signal if the total amount of plants which are mowable on the piece of land does not meet the supply criterion.

7. The system as claimed in claim 3, wherein the piece of land comprises a plurality of fields, each having a total field surface and being connected to each other by a connection which is travelable by the mowing vehicle, and wherein the holder of the mowing vehicle has a storage capacity which is so small compared to the fields that the holder becomes completely filled with mowed plants when only a portion of a field is mowed, and wherein the control system is configured to determine a total amount of plants which are mowable on each individual field and/or on all fields of the piece of land together on the basis of said received parameter, said traveled distance and the total field surface of each field and/or the total surface of the piece of land.

8. The system as claimed in claim 3, wherein the control system is provided with a memory, and wherein the control system is configured to store a plurality of values, determined on different days, in the memory for the total amount of plants which are mowable on the piece of land, and wherein the control system is configured to predict a future total amount of plants which are mowable on the piece of land, on the basis of said stored values.

9. The system as claimed in claim 3, wherein the first mowing position of the mowing vehicle is a mowing starting position on the piece of land, at which the mowing vehicle starts mowing with the mowing device.

10. The system as claimed in claim 3, wherein the second mowing position of the mowing vehicle is a current position on the piece of land, on which the mowing vehicle is situated when mowing with the mowing device.

11. The system as claimed in claim 10, wherein the control system is furthermore configured to update the determination of the total amount of plants which are mowable on the piece of land on the basis of said received parameter, said traveled distance and the total surface of the piece of land, while the mowing vehicle with the mowing device drives across the piece of land.

12. The system as claimed in claim 3, wherein the detection system is provided with a weighing device which is configured to measure the weight of mowed plants accommodated in the holder, and wherein the parameter which is representative of said detected amount of mowed plants comprises a weight parameter which depends on the weight measured by the weighing device.

13. The system as claimed in claim 1, wherein the dwelling space is provided with a feed fence which determines the feeding area, wherein a feeding alley extends along said feed fence, and wherein the mowing vehicle is configured to drive on said feeding alley along said feed fence, and wherein the control system is configured to control the dispensing device for dispensing mowed plants accommodated in the holder, while the mowing vehicle drives on the feeding alley along the feed fence.

14. The system as claimed in claim 1, wherein the mowing vehicle is provided with a plurality of wheels or caterpillar tracks, by which the mowing vehicle is displaceable over a connecting path between the piece of land and the dwelling space and/or over a floor along the feeding area of the dwelling space, as well as a driving and steering system for driving and steering the mowing vehicle, which is controllable by the control system in order to allow the mowing vehicle to drive autonomously.

15. The system as claimed in claim 1, wherein the control system is provided with a position-determining system for determining the position of the mowing vehicle while driving.

16. A method of feeding animals, comprising the step of using the system as claimed in claim 1.

17. The system as claimed in claim 2, wherein the piece of land has a total surface, wherein the mowing vehicle is provided with a detection system for detecting the amount of plants which are mowed by said mowing device on the piece of land while the mowing vehicle with the mowing device is driven from a first mowing position to a second mowing position across the piece of land, and wherein the control system is operatively connected to the detection system for receiving a parameter which is representative of said detected amount of mowed plants, and wherein the control system is configured to determine the distance traveled by the mowing vehicle from said first mowing position to said second mowing position, and wherein the control system is furthermore configured to determine a total amount of plants which are mowable on the piece of land on the basis of said received parameter, said traveled distance and the total surface of the piece of land.

18. The system as claimed in claim 5, wherein the control system generates a signal if the total amount of plants which are mowable on the piece of land does not meet the supply criterion.

19. The system as claimed in claim 4, wherein the piece of land comprises a plurality of fields, each having a total field surface and being connected to each other by a connection which is travelable by the mowing vehicle, and wherein the holder of the mowing vehicle has a storage capacity which is so small compared to the fields that the holder becomes completely filled with mowed plants when only a portion of a field is mowed, and wherein the control system is configured to determine a total amount of plants which are mowable on each individual field and/or on all fields of the piece of land together on the basis of said received parameter, said traveled distance and the total field surface of each field and/or the total surface of the piece of land.

20. The system as claimed in claim 5, wherein the piece of land comprises a plurality of fields, each having a total field surface and being connected to each other by a connection which is travelable by the mowing vehicle, and wherein the holder of the mowing vehicle has a storage capacity which is so small compared to the fields that the holder becomes completely filled with mowed plants when only a portion of a field is mowed, and wherein the control system is configured to determine a total amount of plants which are mowable on each individual field and/or on all fields of the piece of land together on the basis of said received parameter, said traveled distance and the total field surface of each field and/or the total surface of the piece of land.

* * * * *